United States Patent [19]
Randolph

[11] Patent Number: 5,550,832
[45] Date of Patent: Aug. 27, 1996

[54] TIME DIVISION MULTIPLE ACCESS RADIO TRANSMISSION ACTIVATED RECEIVER SWITCH

[75] Inventor: Robert H. Randolph, Brandon, Fla.

[73] Assignee: Digital Call Alert, Lakeland, Fla.

[21] Appl. No.: 354,430

[22] Filed: Dec. 12, 1994

[51] Int. Cl.$^6$ .............................. H04J 3/02; H04B 7/212
[52] U.S. Cl. ........................................ 370/95.3; 455/133
[58] Field of Search ................................. 370/95.3, 95.1; 455/74, 88, 89, 133, 140; 375/216, 260; 379/59

[56] References Cited

U.S. PATENT DOCUMENTS

| | | | |
|---|---|---|---|
| 4,027,249 | 5/1977 | Calman | 455/88 |
| 4,914,714 | 4/1990 | Tamura | 455/133 |
| 4,993,061 | 2/1991 | Hsieh | 379/61 |
| 5,111,454 | 5/1992 | Hung et al. | 370/95.3 |
| 5,187,809 | 2/1993 | Rich et al. | 370/95.3 |
| 5,239,697 | 8/1993 | Kosuga | 455/133 |
| 5,257,401 | 10/1993 | Dahlin et al. | 375/216 |

*Primary Examiner*—Douglas W. Olms
*Assistant Examiner*—Min Jung

[57] ABSTRACT

A method and apparatus for receiving square root cosine pulse uplink transmissions from a transmitting Time Division Multiple Access radiotelephone to activate a switch. Upon initial activation of the switch the apparatus will operate in a dual mode method, that method being from either a TDMA or Analog transmission signal. The apparatus utilizes receivers tuned to decode transmitted time slot frequencies of a TDMA radiotelephone and an analog signal rectifier receiver for analog radiotelephone transmissions to activate a means of audible, visual, mechanical and other notification methods.

6 Claims, 4 Drawing Sheets

5,550,832

TIME DIVISION MULTIPLE ACCESS RADIO TRANSMISSION ACTIVATED RECEIVER SWITCH

BACKGROUND OF THE INVENTION

The invention relates to a local area radiotelephone transmission switch. The preferred embodiment utilizes pulsed radio frequency transmission schemes, such as time division multiple access transmissions (TDMA) to activate a switch or a plurality of switches. The embodiment will be permanently installed in a vehicle such as a car or a boat and interfaced to the vehicles' stereo radio, may be battery operated for portability or operated from 110 or 220 volts alternating current, to provide for a notification means of the radiotelephone transmission.

Digital Cellular Communications and Extended Specialized Mobile Radio systems use Time Division Multiple Access (TDMA) technology as a method of transmitting and receiving voice and data transmissions. This technology is currently used in the U.S. and other countries and allows multiple users to share the same voice and data channels. Each user transmits digitally encoded information in a time slot which is part of a larger frame. The modulation method is Differentially Encoded Quadrature Phase Shift Keying (DQPSK). The result of this type of radio transmission is a square root cosine transmit pulse shape. Each radiotelephone then transmits in a sequence such as follows: transmit, receive, idle. During idle time, another radiotelephone may transmit while another may receive. This process continues, thus creating a time frame. It is therefore not necessary to demodulate the DQPSK encoded in the carrier signal to utilize the transmission. The receiver used detects the electromagnetic radio frequency (rf) pulses emitted from the local area TDMA radiotelephone. The signal is then amplified. The received signal is further pulse shaped and injected into frequency detection circuitry. If the rf pulse signal is in the targeted time slot frequency, the said switch becomes active.

SUMMARY OF THE INVENTION

The present invention is a method and apparatus for receiving TDMA uplink time slots from a locally transmitting TDMA radiotelephone when a TDMA transmission is present and activates a switch. The receiver detects and reconstitutes the square root cosine pulse signal. This signal is shaped and injected into a decoder. If the signal pulse train is in the targeted frequency, the unit activates a switch. Upon activation of said switch, the device is capable of sensing analog electromagnetic waves from a locally transmitting radiotelephone should TDMA transmissions seize. The switch is deactivated upon transmission termination.

DESCRIPTION OF THE PREFERRED EMBODIMENT

Figure 1:
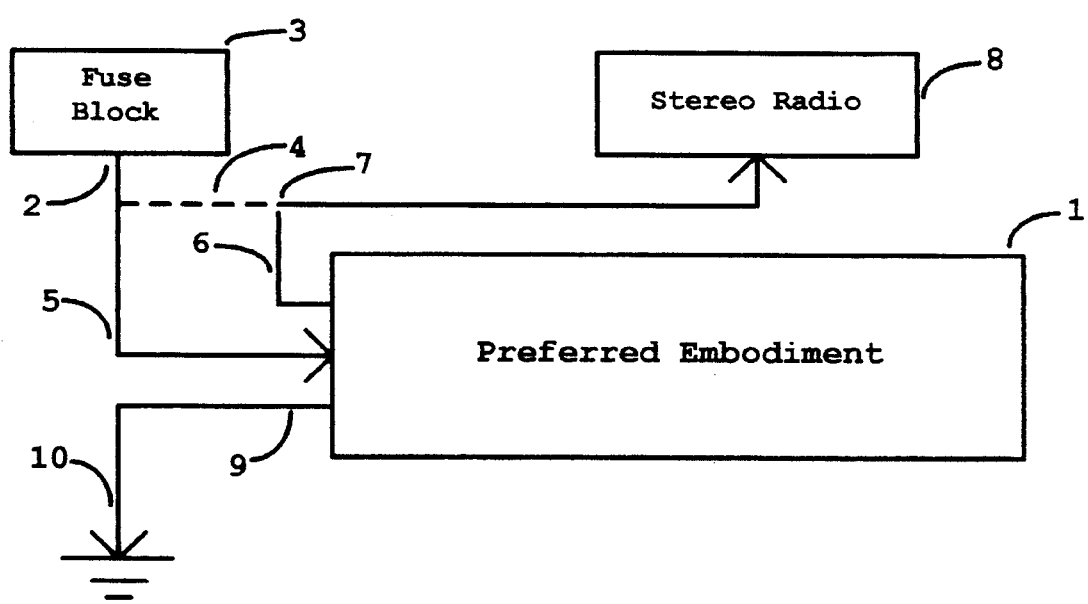
FIG. 1 is a representative view of the preferred embodiment of the present square root cosine pulse notification receiver switch installation.

FIG. 1 illustrates a schematic view of the preferred embodiment permanent installation according to the invention. For descriptive purposes an interface to a vehicle stereo radio is used as a method of a radiotelephone transmission indicator, although the embodiment may also be battery operated for portability or operated from 110 or 220 volts alternating current and interfaced to a mechanical, audible, visual lighting or infrared means of transmission notification. Power to the unit (1) is supplied through ignition switched lead (2), which is alternately the stereo radio power supply coming from the vehicle fuse block (3). Lead (2) is cut at (4) allowing lead (5) to connect to (2) at cut point (4). Lead (6) is then connected at (7), which enables the system voltage to the vehicle stereo radio (8). Lead (9) is tied to ground (10). At the presence of a local Time Division Multiple Access (TDMA) square root cosine pulse signal of the correct time slot frequency, lead (5) goes low and is otherwise open, therefore switching off the power supply to said stereo radio (8) and the stereo radio is shut off. In the absence of the proper TDMA transmission, lead (6) is at system voltage and stereo radio (8) turns on. Stereo radio (8) will remain on until either a local TDMA transmission of the proper time slot frequency is detected or is manually shut off.

The preferred embodiment of the invention can best be understood by reference to a transmission format. In this case the U.S. Cellular TDMA Digital System time frame structure is used, as set forth by the Electronics Industries Association Interim Standard-54 (EIA IS-54), although a number of formats can be accommodated.

Figure 2A:
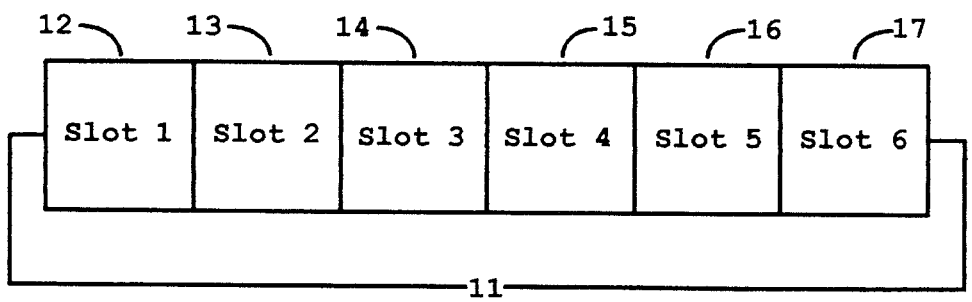
FIG. 2a illustrates a basic TDMA frame structure.

FIG. 2a illustrates a time frame (11). The frame (11) takes 40 milliseconds to transmit and contains 1944 bits or 972 symbols equating to two bits per one symbol. The TDMA time frame (11) is broken down into six time slots such as the time slots indicated by (12–17).

Figure 2B:
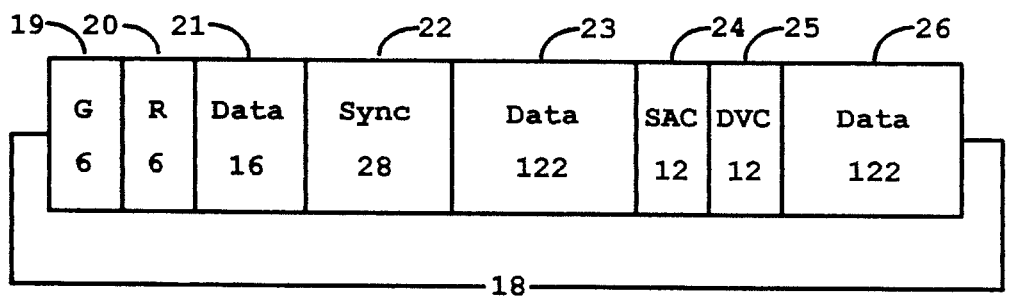
FIG. 2b is a diagram of the time slot format used in the U.S. and some other International TDMA digital cellular systems as established by Electronics Industries Association Interim Standard 54.

FIG. 2b indicates what is in each uplink to the base station transmission time slot (18) and the number of bits. In the preferred embodiment, guard time bits (19), ramp time bits (20), data bits (21), synchronize bits (22), data bits (23), slow associated control channel (SACCH) bits (24), digital verification color code bits (25) and data bits (26), are not necessary since the information of concern is the time slot transmission only. However, these bits make up the 324 bits necessary for one time slot (18) transmission and are 20 milliseconds long.

Figure 2C:
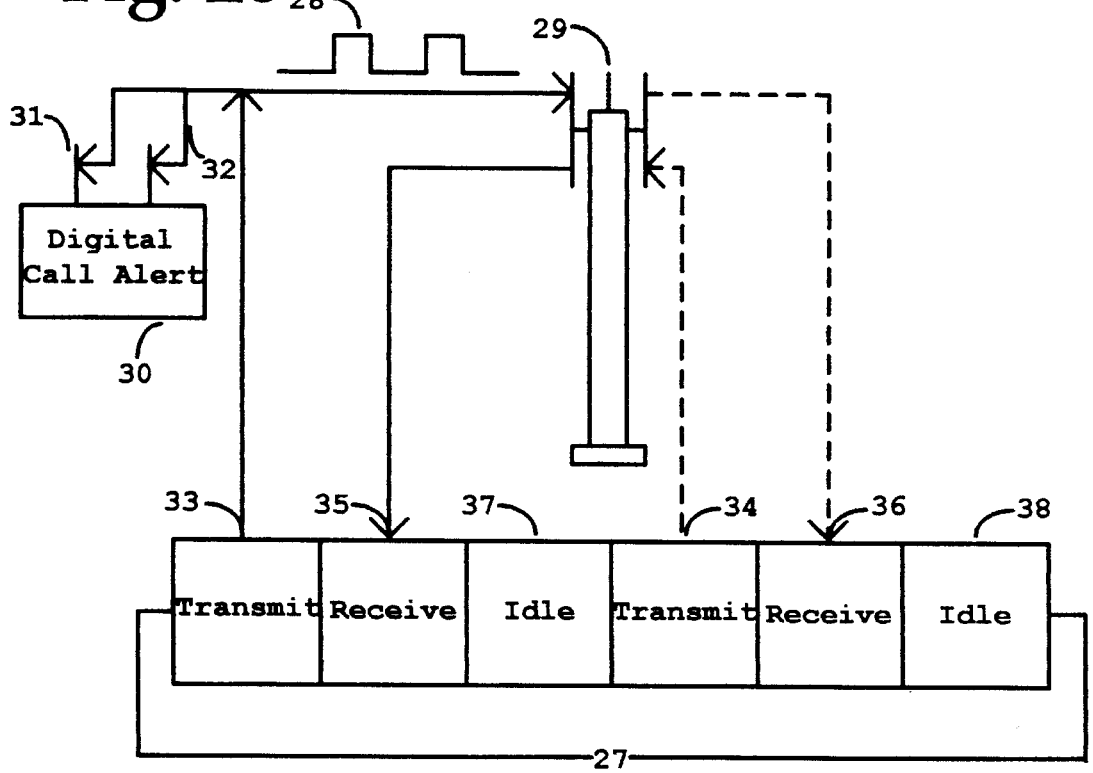
FIG. 2c is a simplified diagram of the time slot transmission scheme for the U.S. TDMA digital cellular telephone system.

FIG. 2c is a diagram of a TDMA cellular frame (27) with a radiotelephone transmitting uplink pulse train (28) to base station (29) and the preferred embodiment (30) antenna system (31) and (32), on two time slots (33) and (34). The time slots used for transmission are slots 1 (33) and 4 (34). Other TDMA radiotelephones will be transmitting on slots 2 and 5 (35) and (36) and slots 3 and 6 (37) and (38). The TDMA radiotelephone transmission operation as shown is as follows: transmit (33), receive (35), idle (37), transmit (34), receive (36), idle (38). EIA IS-54 currently specifies a 3:1 transmission, thus allowing three simultaneous users on one voice or traffic channel. Since there are 6 time slots and 3:1 operation, each TDMA radiotelephone operates in two slots to fill the frame as specified in EIA IS-54. This may be specified as full rate operation. Each time slot (33), (35), (37), (34), (36) and (38) is 20 milliseconds long. Future provisions will call for 6:1 operation, with a TDMA radiotelephone transmitting in one time slot rather than two, being specified as half rate operation or extended TDMA. The preferred embodiment (30) is capable of operating in full rate mode and fractions thereof.

The following describes the operation of the preferred embodiment as it relates to the reception of a TDMA transmission signal.

Figure 3:
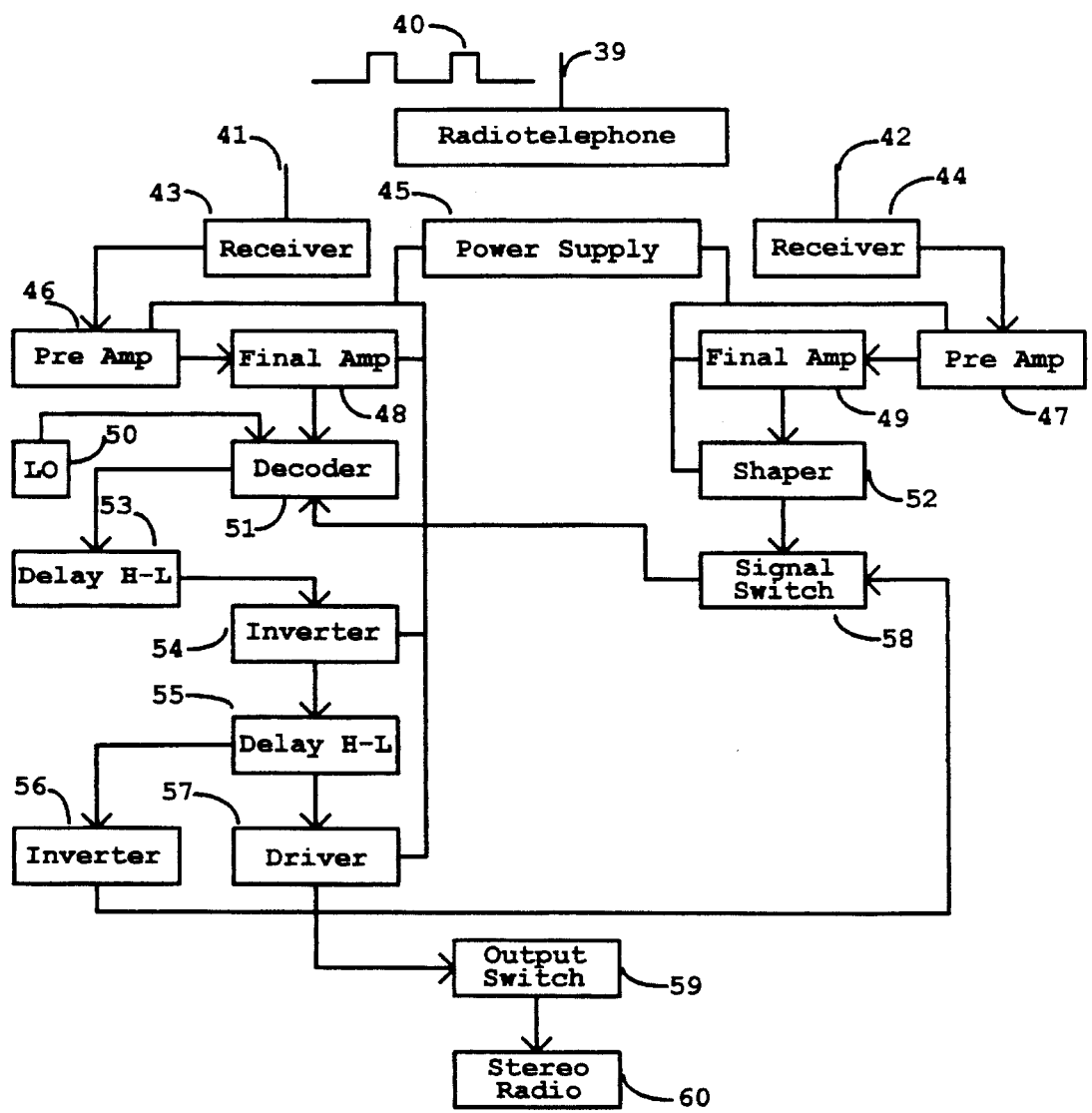
FIG. 3 is a block diagram of a local radiotelephone uplink TDMA square root cosine pulse notification receiver switch.

FIG. 3 is a block diagram of the preferred embodiment. A local area Time Division Multiple Access (TDMA) radiotelephone (39) is transmitting to the system base station a digitally encoded square root cosine radio wave signal (40) in a system specified time slot. For descriptive purposes, the current U.S. TDMA Cellular System is used, as set forth by EIA IS-54. This signal (40) is a square root cosine pulse train of 50 hertz.

The present invention operates from a fixed regulated power supply (45) and employs a set of two antennas (41) and (42) linking the radio transmission uplink square root cosine pulse signal (40) to the input of TDMA and analog (dual-mode) transmission receiver (43) and TDMA transmission receiver (44) which are sensitive to transmission (40) emanating from local area TDMA radiotelephone (39). Transmission (40) is fed to dual-mode low gain master pre amplifier (46) and secondary TDMA pre amplifier (47) where the signal is then further amplified at final dual-mode high gain master amplifier (48) and secondary final amplifier (49). In the preferred embodiment, the separate antenna receivers (41), (42) and amplifiers (46), (48), (47) and (49) work to eliminate signal (40) cancellation due to out of phase signals, fading and echo effects. To accommodate the various power levels a transmitting TDMA radiotelephone may emit, to avoid interference from nearby transmitting TDMA radiotelephones as well as elimination of automatic gain control circuitry, master dual-mode pre amplifier (46) and master dual mode final amplifier (48) are permanently fixed to provide enough gain to activate the necessary functions of the preferred embodiment when a local area TDMA radiotelephone transmits a square root cosine pulse signal within the general confines of a vehicle. Shielding of the preferred embodiment is inherent to the invention and methods of installation by means of metal door and support structures, dashboards, roofing and the vehicle in general. The inherent shielding of the preferred embodiment due to the installation therefore enhances the invention's operation while eliminating unwanted activation of the switch.

Secondary TDMA pre amplifier (47) and secondary TDMA final amplifier (49) combine to form a permanently set high gain system. The sensitivity of (47) and (49) is necessary to accommodate the lower power levels of a TDMA radiotelephone. The output signal of final amplifier (49) is shaped (52) to reconstitute signal (40), then output to switch (58) where the signal flow is temporarily terminated.

The signal output of (48) is fed into decoder (51). In the preferred embodiment, decoder (51) is sensitive to a preset time slot frequency determined by local oscillator (50). For descriptive purposes, decoder (51) is sensitive to an input time slot frequency of the U.S. TDMA digital cellular system, 50 hertz, +/−5 hertz. The input signal to (51) must be >20 millivolts, in the correct time slot frequency and within the bandwith of (50), in which case (51) switches from a high state, to a low state, approximately 0 volts.

The switching transition of the decoder (51) is delayed (53), providing a watchdog system to ensure an actual TDMA transmission is present before activating other circuits, adds noise immunity, as well as ensuring the TDMA radiotelephone is able to complete a dialed phone number. Delay circuit (53) prevents accidental activation of the output switch when a TDMA radiotelephone registers with, in this example, the TDMA Digital Cellular System.

When delay circuit (53) has reached the low transition threshold, inverting buffer (54) sends a high level signal to delay transition circuit (55). The output of delay (55) is then input to driver (57). Driver (57) then activates output switch (59), thus switching off power to the vehicle stereo radio (60). Delay circuit (55) provides a method to keep the stereo radio (60) off for a window of several seconds should the TDMA transmission (40) no longer be present. Within this period the preferred embodiment expects a valid signal (40). If no signal is present during the window, the output switch is deactivated.

Delay circuit (55) when low, further drives inverting buffer (56). The output of (56) is fed to switch (58). At this stage and as previously described, the output signal of shaper (52) has been halted at (58). With (56) turning on switch (58) the amplified and shaped signal is output through (58) into decoder (51). From here the operation to activate the output switch (59) is as previously described. The apparent redundancy assures the output switch (59) remains activated throughout all TDMA power levels and antenna polarities and creates a self sustaining loop.

In the preferred embodiment, the loop to turn on driver (57) and output switch (59) is created employing decoder (51), delay (53), inverting buffer (54), delay (55), inverting buffer (56) and signal switch (58). This loop assures driver (57) receives the necessary signal to keep output switch (59) open should the received signal (40) be too weak for amplification by dual-mode master amplifiers (46) and (48). The loop is self sustaining due to high gain and sensitivity secondary TDMA amplifiers (47) and (49) once the proper TDMA signal (40) is amplified and detected by decoder (51) and switch (58) is turned on.

The previous description of the preferred embodiment relates to its operation using time division multiple access radiotelephone transmissions. Some systems, such as the U.S. TDMA Cellular Digital Network, cause a transmitting radiotelephone to switch modes of transmission from TDMA to analog. This operation is necessary in order to continue a transmission should there be a deficiency of digital channels.

Figure 4:
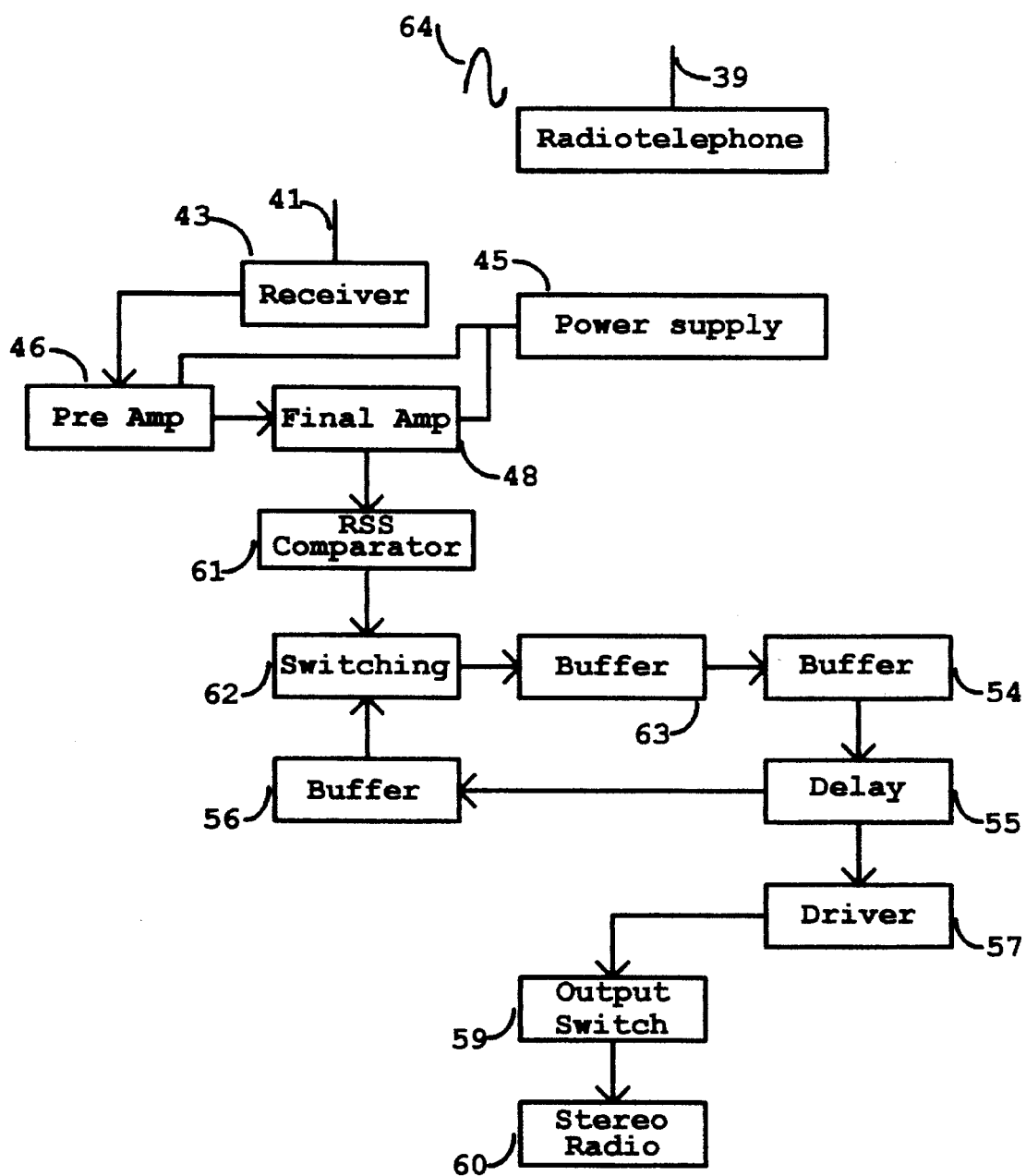
FIG. 4 is a block diagram of the analog receiver circuit and interface.

FIG. 4 is a block diagram depicting the interface of the analog transmission sensing circuit to the digital transmission control circuitry from FIG. 3. The circuits employed from FIG. 3 are voltage regulator (45), antenna (41), dual-mode receiver (43), dual-mode master pre amplifier (46), dual-mode master final amplifier (48), inverting buffer (54), delay (55), inverting buffer (56), driver (57), output switch (59) and for explanatory purposes stereo radio (60). The analog sensing circuitry only operates output switch (59) after a TDMA transmission has been received and inverting buffer (56) has passed a legal level high signal to switch (62) in the analog sensing circuitry. When radiotelephone antenna (39) radiates analog signal (64), antenna (41) receives the signal where it is passed to dual-mode master receiver (43). Receiver (43) is tuned to a band of frequencies corresponding to those of interest. Received analog transmission signal (64) is rectified in (43). The rectified output of (43) is amplified at master dual-mode pre amplifier (46) and master dual mode final amplifier (48). The output of (48) represents a direct current voltage proportional to the analog transmission received signal strength, with sensitivity limited to allow amplification of analog signals from a locally transmitting radiotelephone. The output of (48) is compared in received signal strength comparator (61) to a reference voltage. The output of (61) is switched (62) by inverting buffer (56). As previously described in FIG. 3, at the presence of the proper TDMA signal, inverting buffer (54) outputs a signal to delay (55). Delay (55) drives inverting buffer (56) and the output switch (59) driver (57). With (56) driving switch (62), the output of (62) is input to inverting buffer (63). The output of buffer (63) is input to inverting buffer (54). This finalizes a loop circuit, thus allowing the received analog signal (64) to continually activate the output switch. This finalizes the analog signal loop circuit and allows the received analog signal (64) to continually activate the output switch (59) thus keeping stereo radio (60) off.

In the analog operation, the receiver and detector for TDMA operation remains in a ready state and therefore will respond quickly should the local area analog transmission switch back to TDMA transmission.

Additional features may be added to the present embodiment to enhance its capabilities. For example lighting of a specific nature as a method of notification. As may be understood by those familiar with the art, the present invention may be embodied in other specific forms while still adhering to the spirit or essential characteristics thereof. Hence, divulgence of the preferred embodiment of the present invention is intended to be expressive, but not limiting of the scope of the invention, which is set forth in the following claims:

Therefore I claim:

1. A system for receiving time division multiple access radiotelephone transmissions to activate a switch, comprising:

means for receiving a square root cosine pulse transmission, wherein said means for receiving a square root cosine pulse transmission activates said switch upon initial power up of the said system, means for receiving local area TDMA radiotelephone transmission time slots using a plurality of receivers for receiving said transmitted time slots, therefore reconstituting the square root, cosine pulse shape of the said transmitted time slot, to prevent signal cancelling, fading and echo effects, and to activate a switch, means for activating a switch when a transmitted time slot of the proper frequency is detected within a plurality of different TDMA time slot frequencies, means for detecting a change from TDMA to analog transmission, for holding said switch in its state even when said analog transmission is detected, means for interfacing switch control circuits to a plurality of receivers to accomplish a redundancy of operation, therefore ensuring correct operation of the switch, means for utilizing time delay to keep the switch active if a received TDMA or analog signal is temporarily disturbed during transmission, the switch remaining active throughout the entire period of the radiotelephone transmission, therefore deactivating said switch when said transmission is terminated, and means for detecting an analog transmission in the targeted frequency range, allowing said switch to remain active if a TDMA transmission switches to analog transmission.

2. The system recited in claim 1, wherein said switch is connected to a vehicular mounted stereo radio power supply, therefore turning off said stereo radio upon reception of a TDMA time slot of the proper frequency.

3. The system recited in claim 1, wherein said system is batter,/operated and therefore portable, providing a means of notification to a TDMA radiotelephone user of the transmission of said radiotelephone by mechanical, audible or lighting means.

4. The system recited in claim 1, wherein said system is powered from common household electrical power used in other countries and notification means includes recorded voice messages, other audible sources, lighting or mechanical means.

5. The system recited in claim 1, wherein said system is powered from common household electrical power and the system activates an infrared transmission as a notification means.

6. The system recited in claim 1, wherein said system activates a plurality of output switches to accommodate a plurality of on and off functions.

\* \* \* \* \*